United States Patent
Widell et al.

(10) Patent No.: US 9,060,375 B2
(45) Date of Patent: Jun. 16, 2015

(54) METHODS AND APPARATUSES FOR UPLINK RESOURCE UTILIZATION IN A TELECOMMUNICATIONS SYSTEM

(71) Applicant: TELEFONAKTIEBOLAGET L M ERICSSON (publ), Stockholm (SE)

(72) Inventors: Daniel Widell, Vikbolandet (SE); Andreas Bergström, Vikingstad (SE); Paul Schliwa-Bertling, Ljungsbro (SE); Stefan Wänstedt, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 185 days.

(21) Appl. No.: 13/808,400

(22) PCT Filed: Nov. 23, 2012

(86) PCT No.: PCT/SE2012/051295
§ 371 (c)(1),
(2) Date: Jan. 4, 2013

(87) PCT Pub. No.: WO2014/081360
PCT Pub. Date: May 30, 2014

(65) Prior Publication Data
US 2014/0148188 A1    May 29, 2014

(51) Int. Cl.
*H04W 72/00* (2009.01)
*H04W 72/08* (2009.01)
*H04W 72/12* (2009.01)

(52) U.S. Cl.
CPC ........ *H04W 72/085* (2013.01); *H04W 72/1252* (2013.01)

(58) Field of Classification Search
CPC ..... H04L 1/0001; H04L 1/188; H04L 1/1002; H04W 72/085; H04W 72/1252; H04W 72/1257; H04W 72/1278

USPC ............ 455/452.1, 452.2, 453; 370/389, 252
See application file for complete search history.

(56) References Cited

U.S. PATENT DOCUMENTS

| | | | | |
|---|---|---|---|---|
| 2009/0323686 A1* | 12/2009 | Dyck et al. | ................... | 370/389 |
| 2011/0032832 A1* | 2/2011 | Jalali et al. | ................... | 370/252 |

FOREIGN PATENT DOCUMENTS

| | | | | |
|---|---|---|---|---|
| DE | EP 1513304 B1 * | 9/2005 | ................... | 370/389 |
| KR | EP 1069790 A2 * | 1/2001 | ................... | 370/252 |
| WO | WO 2007/088465 | 8/2007 | | |

OTHER PUBLICATIONS

PCT International Search Report for International application No. PCT/SE2012/051295, Aug. 12, 2013.
3GPP TS 44.060 V11.2.1, 3rd Generation Partnership Project; Technical Specification Group GSM/EDGE Radio Access Network; General Packet Radio Service (GPRS); Mobile Station (MS)—Base Station System (BSS) Interface; Radio Link Control/Medium Access Control (RLC/MAC) Protocol (Release 11) (Sep. 2012).

* cited by examiner

*Primary Examiner* — Khalid Shaheed
(74) *Attorney, Agent, or Firm* — Baker Botts, LLP

(57) ABSTRACT

It is presented methods and apparatuses for uplink resource utilization in a telecommunication system. More particularly, embodiments disclosed herein relate to a method performed in a user equipment (4), said user equipment (4) having data ($D_i$) ready to transmit, the data pertaining to a traffic class (i). The method comprises establishing a connection with a radio network node (2) and receiving threshold parameter sets ($Th_i$) from the radio network node (2). Each threshold parameter set ($Th_i$) comprising at least a minimum size limit ($S_i$) associated with respective traffic class (i). The threshold parameter sets ($Th_i$) are used to determine if the amount of data that the user equipment (4) has ready to transmit is large enough to be transmitted or if it has been waiting long enough to be transmitted. If it is the UE (4) transmits the data to the radio network node (2). There are also presented a corresponding method performed in the network node (2) and a user equipment (4) and a network node (2) for performing the methods.

19 Claims, 3 Drawing Sheets

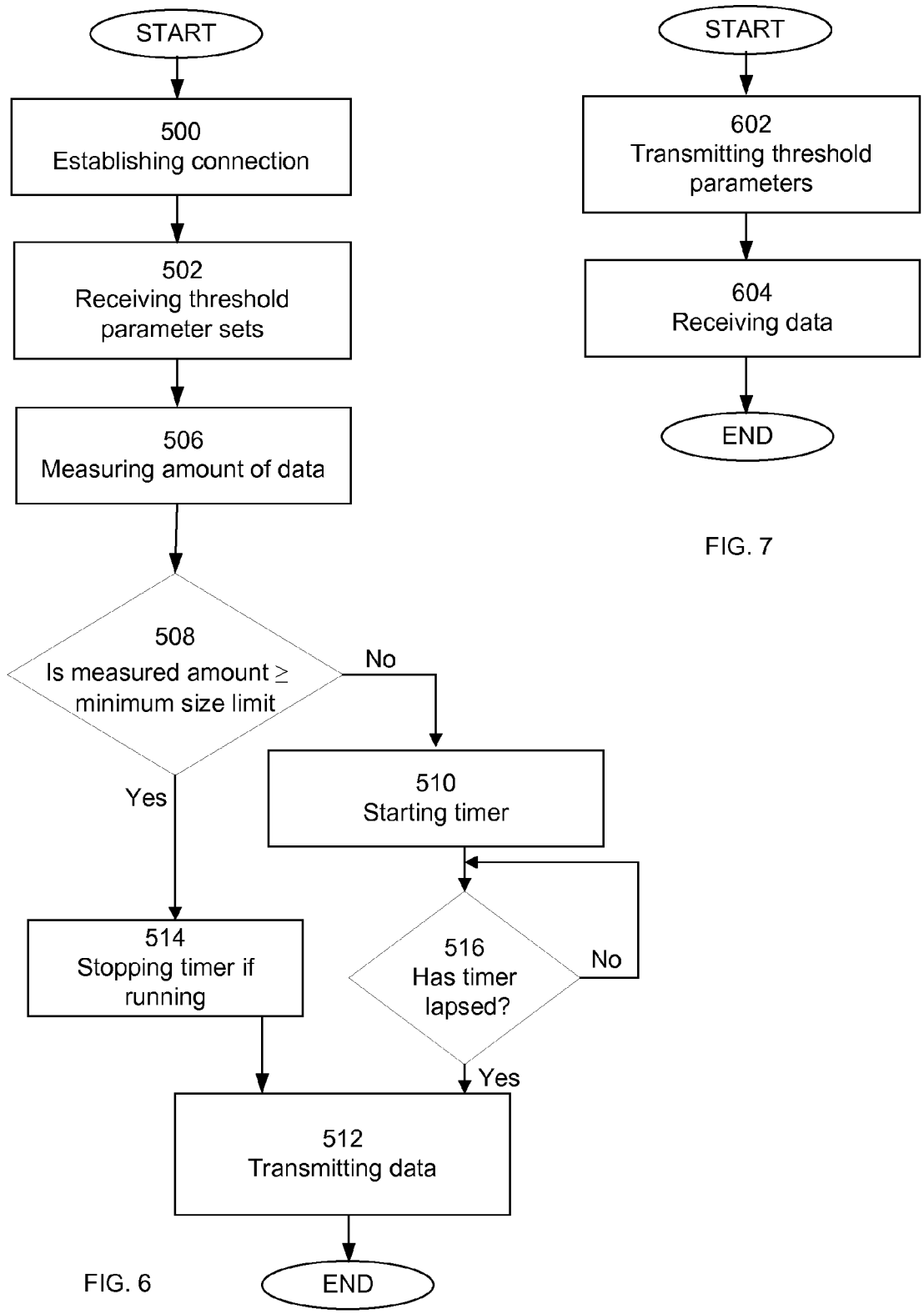

METHODS AND APPARATUSES FOR UPLINK RESOURCE UTILIZATION IN A TELECOMMUNICATIONS SYSTEM

This application is the U.S. national phase of International Application No. PCT/SE2012/051295 filed 23 Nov. 2012 which designated the U.S., the entire contents of which is hereby incorporated by reference.

TECHNICAL FIELD

Embodiments of the present disclosure generally relate to reducing network load in a telecommunication system. More particularly, embodiments disclosed herein relate to methods performed in a user equipment and in a network node, respectively, for reducing network load. Furthermore, embodiments of the present disclosure are also directed to a corresponding a user equipment and network node.

BACKGROUND

In wireless data communication systems there is today an ever growing need for more and more data transmission. Such wireless data communication systems may for example be the Global System for Mobile communication/Enhanced Data rates for GSM Evolution and Enhanced Data rates for Global Evolution (GSM/EDGE), Wideband Code Division Multiple Access/High-Speed Packet Access (WCDMA/HSPA) and Long-Term Evolution (LTE). This increase in data transmission is mainly due to the growing number of devices that need to be connected to the wireless data communication system in order to function properly, such as smart meters, smart household appliances, and smart phones having applications demanding wireless data connections. The behavior of such data communication is often unpredictable and of a bursty nature leading to the establishment of many connections which then also are released to the wireless data communication system.

For a user equipment (UE), such as smart phones or smart meters, the connection establishment can either be network triggered or UE triggered. In case the connection establishment is triggered by the UE, the UE will generally trigger the connection establishment procedure as soon as the UE has data available for transmission. There exist a vast number of examples of the above behavior, such as the periodic synchronization and status updates of social media/instant messaging service applications, the reporting of consumed power from smart power meters to the power company etc. It is among other things this type of behavior that increases the network load and thus there is a need for improving the uplink resource utilization.

SUMMARY

In view of the above, an improved way to utilize uplink resources would be advantageous. The inventors of the present invention have realized that when it comes to transmission of data the UE does today not make any considerations in respect of the nature of the data to be transmitted, how delay sensitive the data is or how large amount of data that is to be transmitted. Today the UE as such may periodically establish a connection for transmitting a very small amount of data and then afterwards the network will release the connection, even if the data itself is not delay sensitive and the amount of data is very small for each connection establishment.

It is therefore a general object of embodiments of the present disclosure to improve the uplink resource utilization.

According to an aspect, a method is provided which is performed in a UE. The UE is capable of transmitting data pertaining to at least a first predefined traffic class. The method comprises receiving at least a first threshold parameter set from the radio network. The first threshold parameter set comprising at least a minimum size limit associated with first predefined traffic class. The method further comprises measuring an amount of data that the UE has ready to transmit, said data pertaining to the first predefined traffic class, comparing the measured amount of data with the minimum size limit associated with the first predefined traffic class, and transmitting said data pertaining to the first predefined traffic class from the UE to the radio network in case the measured amount of data exceeds the received minimum size limit.

In various embodiments the data that is ready to be transmitted belongs to different predefined traffic classes. The method further comprises calculating an aggregate amount of data for different predefined traffic classes to a single data amount.

In yet other embodiments the first threshold parameter set comprises a maximum time limit associated with the first predefined traffic class, the method further comprising the steps of starting a timer in the UE in case the amount of measured data is less than the minimum size limit and transmitting said data from the user equipment to the radio network in response to that the timer has reached the received maximum time limit.

According to another aspect a UE is provided for reducing network load. The UE is capable of transmitting data pertaining to at least a first predefined traffic class. The UE comprises a communication interface arranged for wireless communication; a processor; and a memory storing computer program code which, when run in the processor, causes the UE to receive, via the communication interface, at least a first threshold parameter set from the radio network, the first threshold parameter set comprising at least a minimum size limit associated with the first predefined traffic class, measure an amount of data that the UE has ready to transmit, said data pertaining to the first predefined traffic class, compare the measured amount of data with the minimum size limit associated with the first predefined traffic class, and transmit, via the communication interface, said data pertaining to the first predefined traffic class from the UE to the radio network in case the measured amount of data exceeds the received minimum size limit.

In various embodiments the data that is ready to be transmitted belongs to different predefined traffic classes. The UE is further caused to calculate an aggregate amount of data for all different predefined traffic classes.

In yet other embodiments the first threshold parameter set comprises a maximum time limit associated with the first predefined traffic class and the UE is further caused to start a timer in the UE in case the measured amount of data is less than the minimum size limit and transmit the data from the UE to the radio network in response to that the timer has reached the received maximum time limit.

According to a further aspect a method is provided which is performed in a radio network node for reducing network load. The method comprises transmitting at least a first threshold parameter set to a UE, the first threshold parameter set comprising at least a minimum size limit associated with a first predefined traffic class, and receiving data from the UE in case the amount of data that the UE is ready to transmit exceeds the transmitted minimum size limit.

According to a yet another aspect a radio network node is provided for reducing network load, said radio network node comprising a communication interface arranged for wireless communication; a processor; and a memory storing computer program code which, when run in the processor, causes the radio network node to transmit, via the communication interface, at least a first threshold parameter set to a UE, the first threshold parameter set comprising at least a minimum size limit associated with a first predefined traffic class, and receive data from the UE in case the amount of data that the user equipment is ready to transmit exceeds the transmitted minimum size limit.

An advantage of embodiments herein is that before a data transmission begins considerations in respect of the nature of the data is made. By making such considerations it is possible to avoid the frequent establishing of connections transmitting very small amounts of data, even if the data itself is not delay sensitive.

BRIEF DESCRIPTION OF THE DRAWINGS

These and other aspects, features and advantages of embodiments of the present disclosure will be apparent and elucidated from the following description of various embodiments, reference being made to the accompanying drawings, in which:

FIG. 6 is a flow chart illustrating a method performed by a user equipment according to another exemplary embodiment of the present disclosure; and FIG. 7 is a flow chart illustrating a method performed by a network node according to an exemplary embodiment of the present disclosure.

DETAILED DESCRIPTION

The invention will now be described more fully hereinafter with reference to the accompanying drawings, in which certain exemplary embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the present disclosure to those persons skilled in the art. Like numbers refer to like elements throughout the description.

Figure 1:
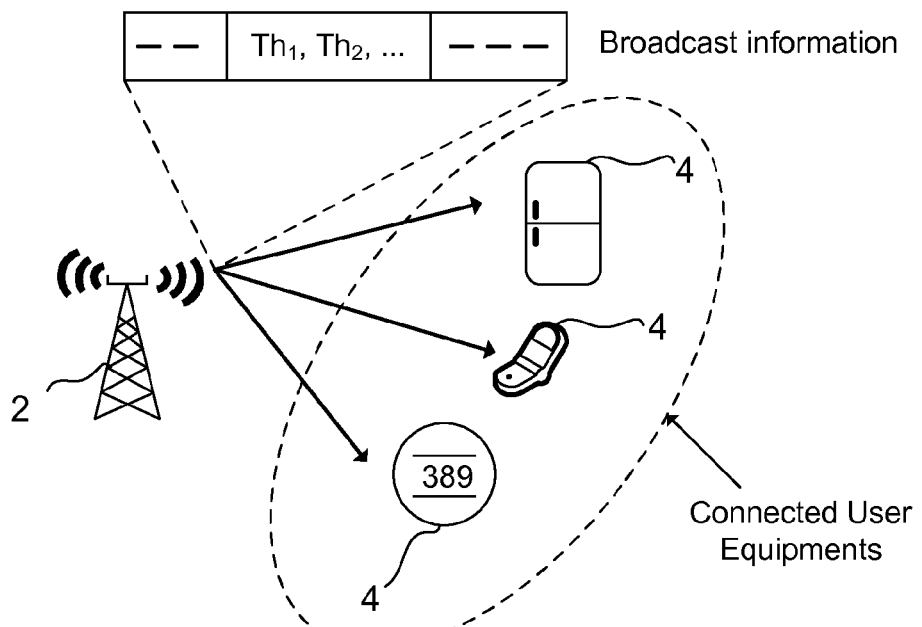
FIG. 1 is a schematic diagram illustrating an exemplary environment, in which threshold parameter sets are included in broadcasted information, according to embodiments presented herein.
Figure 2:
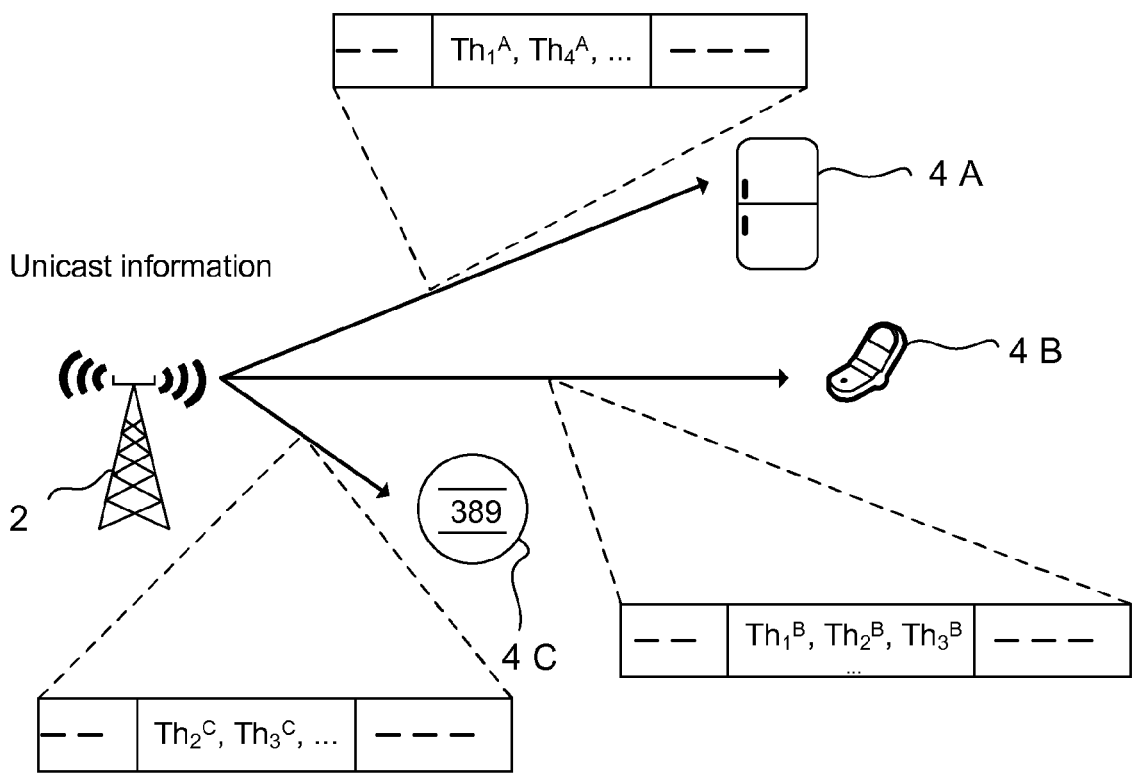
FIG. 2 is a schematic diagram illustrating an exemplary environment, in which threshold parameter sets are included in unicast information, according to embodiments presented herein.

FIG. 1 illustrates an exemplary environment of a communication radio network, in which embodiments described herein may be practiced. The exemplary environment comprises a radio network node 2 and different types of UEs 4 connected to the radio network node 2. The UEs 4 have data that they are ready to transmit. The radio network node 2 is configured to send broadcast information including a threshold parameter set. The threshold parameter set is denoted $Th_i$, where i is an index associated with a traffic class to which the threshold parameter set pertains. Thus, assuming, for example, that the traffic classes have been numbered 1 to n (where n being the total number of traffic classes) i may then simply be a number of the traffic class. Alternatively, the index value i may be just a name or other unique designation associated with the traffic class such as $Th_{gold}$, which may be associated with a traffic class comprising mobile telephone subscribers having a gold subscription. In FIGS. 1 and 2 numbers are used to denote different types of traffic classes. Hereinafter, the term "traffic class i" will be used for the sake of simplicity instead for the more correct "index value i associated with a traffic class".

The traffic class i is used to categorize or divide data into different groups our categories. By categorizing data it is possible to treat different categories or traffic classes with different priorities. Thus, the data that the UEs 4 has ready to transmit may be divided into different traffic classes i. The grouping or classifying of data may be done in any predefined way. The different traffic classes may for example be different Quality of Service (QoS) classes. Another alternative is that the data is classified according to different radio priority levels, for example 1 to 4 as indicated by the Enhanced General Packet Radio Service (EGPRS) Packet Channel Request, see 3rd Generation Partnership Project (3GPP) TS 44.060 V.11.2.1, Section 12.14. Yet another example is classes specified by an operator of the network, such as different subscription categories or the like. As is understood there may be many other ways to predefine or group the data that the UEs 4 are ready to transmit. Alternatively, it is however also possible to use only one traffic class i to carry out the present invention.

Instead of broadcasting the threshold parameter sets $Th_i$ as above it is also possible to transmit the threshold parameter sets $Th_i$ via unicast transmission or as dedicated signaling to each UE 4. This might be done for example by using Radio Resource Control (RRC) reconfiguration in LTE or configuring the signaling using Over-The-Air programming (OTA). This situation is depicted in FIG. 2, which also depicts an exemplary environment, comprising the radio network node 2 and different UEs 4. In FIG. 2 the UEs are not seen as one group of connected UEs 4 as in FIG. 1, but as different types of UEs, such as a connected refrigerator 4A, a mobile telephone 4B and a connected power meter 4C. There may also be many other types of UEs, the limitation being that it has to be connectable to the network node 2.

In FIG. 2 the different types of UEs 4 may be provided with different threshold parameter sets $Th_i^X$, where the superscript X denotes the type of UE that is addressed, i.e. 4A, 4B or 4C, in the example depicted in FIG. 2. The advantage with this procedure is that each UE 4A, 4B or 4C only needs to be configured with the threshold parameter sets $Th_i^X$ that pertain to the traffic classes i that it may use, but not the traffic classes i that it is not capable of using. Different UEs may also be configured with different threshold parameter sets $Th_i^X$ even for the same class i. This may be very useful if for example the operator of the network node 2 wishes to treat the same type of data from different UEs differently depending on for example subscription levels.

In the example of FIG. 2, UE 4A will receive threshold parameter sets $Th_i^A$ associated with traffic classes 1 and 2, UE 4B will receive threshold parameter sets $Th_i^B$ associated with traffic classes 1, 2 and 3 and UE 4C will receive threshold parameter sets $Th_i^C$ associated with traffic classes 2 and 3. As will be understood this is just an example of how unicast information may be distributed to the UEs and there are many other ways to this.

Naturally it is also possible to use a combination of broadcast and unicast. For example the network node 2 may broadcast a baseline of threshold parameter sets $Th_i$, which then may be overridden by unicast signaling of UE specific parameters $Th_i^X$ to selected devices X. When broadcasted the threshold parameter sets $Th_i$ may be sent in System Information Blocks (SIB), as Multimedia Broadcast/Multimedia Service (MBMS) or as paging. For unicast it may be performed using the Radio Resource Control (RRC) or OTA as mentioned above.

Figure 3:
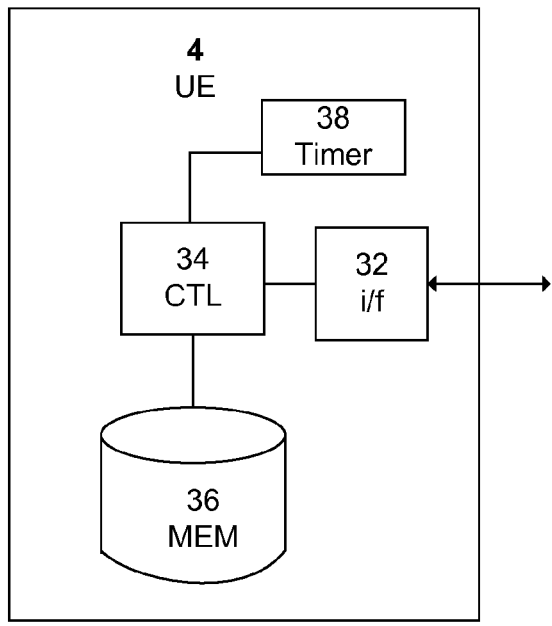
FIG. 3 is a schematic diagram illustrating some modules of an exemplary embodiment of a user equipment.

FIG. 3 is a schematic diagram illustrating some modules of an exemplary embodiment of the UE 4. As mentioned above the UE 4 may be any type of device that is connectable to the network node 2, such as a smart phone, mobile telephone, a cellular phone etc. The UE 4 may also be a Machine Type Communication (MTC) device such as a smart power meter, a smart household appliance etc. However, it is equally possible that the UE 4 could be a laptop computer, tablet computer or the like. The UE 4 comprises a controller (CTL) which may be a processor 34 that may be constituted by any suitable Central Processing Unit, CPU, microcontroller, Digital Signal Processor, DSP, etc., capable of executing computer program code. The computer program may be stored in a memory (MEM) 36. The memory 36 can be any combination of a Read And write Memory, RAM, and a Read Only Memory, ROM. The memory 36 may also comprise persistent storage, which, for example, can be any single one or combination of magnetic memory, optical memory, or solid state memory or even remotely mounted memory. The UE 4 further comprises a timer 38 which may be realized in hardware, in software or any combination thereof. Three is also arranged a communication interface (i/f) 32 in the UE 4 for wireless communication with other devices or nodes, such as the radio network node 2.

When the above-mentioned computer program code is run in the processor 34 of the UE 4, it causes the UE 4 to establish a connection with a radio network node 2, via the communication interface 32 and receive, via the communication interface 32, at least a first threshold parameter set $Th_i$ from the radio network node 2. Each threshold parameter set $Th_i$ comprising at least a minimum size limit $S_i$ associated with respective traffic class i. It should be understood that the UE 4 may receive many different types threshold parameter sets $Th_i$ depending on the type UE 4 and/or the type of subscription the particular UE 4 has and/or any operator specific requirements.

The connection establishment is triggered when the UE 4 has data ready to be transmitted. However, before commencing the connection establishment the UE 4 is receiving the above mentioned threshold parameter sets $Th_i$. In exemplary embodiments the UE may be forced to read the network broadcasted or unicasted information such that it receives the thresholds parameter sets. The minimum size limit $S_i$ may for exemplary embodiments correspond to even multiples of a radio block. Using EGPRS as an example the lowest Modulation and Coding Scheme (MCS), MCS1 may convey 178 bits in one radio block. Other Radio Access Networks (RAN) may have similar limits.

The UE 4 is further caused to measure the amount of data $D_i$ that it has ready to transmit, compare the measured amount of data $D_i$ with the minimum size limit $S_i$ for the traffic class i, and transmit, via the communication interface 32, said data from the UE 4 to the radio network node 2 in case the measured amount of data $D_i$ exceeds the received minimum size limit $S_i$. One way to measure the amount of data $D_i$ is measure one or more of the data buffers provided for in the Radio Link Control (RLC) layer. It should be understood that even if the above example states that the threshold parameter set or sets $Th_i$ are received by the UE 4 from a specific radio network node 2 and the data transmitted from the UE 4 are transmitted to that radio network node 2, it does not need to be the same network node 2. If for example the UE 4 is moving it might receive the threshold parameter sets $Th_i$ from one network node and then later on send data to another network node. Thus, in context of this application the receiving from and transmitting to the radio network node should be interpreted broadly and include any node in the radio network, such as Evolved Node B (eNB or eNodeB) in LTE, the Radio Network Controller (RNC) in Universal Mobile Telecommunications System, (UMTS) or the Base Station Controller (BSC) in Global System for Mobile communications, GSM.

If the UE 4 has data ready to transmit belonging to different traffic classes i, it may in an exemplary embodiment instead of measuring the amount of data belonging to one traffic class i, calculate an aggregate amount of all or some of the measured data $D_i'$ for different traffic classes i using the formula:

$$D_i' = \sum_{i \in j} D_j$$

where $J = \{j_1, j_2, \ldots\}$

J is a subset of two or more of all the predefined traffic classes. Thus, the aggregate amount of measured data $D_i'$ may be calculated by performing a summation of measured amounts of data pertaining to all or a subset of J of the different predefined traffic classes i. As is understood there may be many different ways to calculate an aggregate amount of measured data $D_i'$ depending of which subsets J that are used to do the summation. The type of aggregate amount of data to be calculated may be decided by an operator of the telecommunication system. Thus, in context of the present disclosure when describing that the measured amount of data $D_i$ exceeds the received minimum size limit $S_i$ this may also includes that the aggregate amount of measured data $D_i'$ calculated as described above exceeds the minimum size limit $S_i$.

In an another exemplary embodiment the UE 4 is configured to receive, via the communication interface 32, threshold parameter sets $Th_i$ comprising a maximum time limit $T_i$ associated with predefined traffic class i, start a timer 38 in case the measured amount of data $D_i$ is less than the received minimum size limit $S_i$, and transmit, via the communication interface 32, said data from the UE 4 to the radio network node 2 in response to that the timer 38 has reached the received maximum time limit $T_i$.

As mentioned above the threshold parameter sets $Th_i$ may be broadcasted or unicasted to the UEs 4, and the UEs 4 are configured to receive the threshold parameter sets $Th_i$ both as broadcast information and as unicast information.

Figure 4:
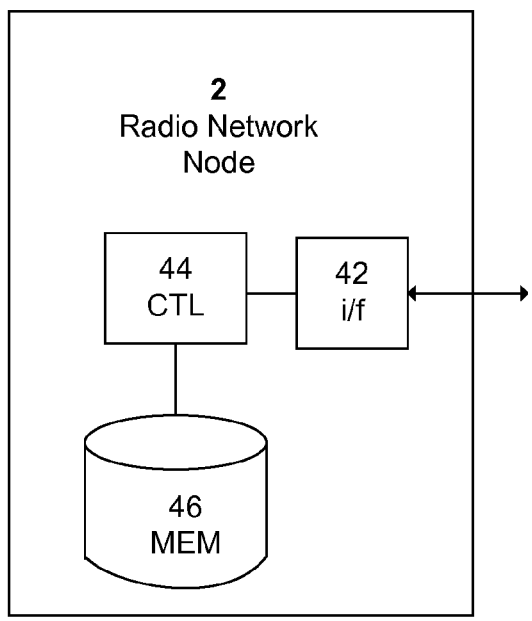
FIG. 4 is a schematic diagram illustrating some modules of an exemplary embodiment of a radio network node.

FIG. 4 is a schematic diagram illustrating some modules of an exemplary embodiment of a radio network node 2. The radio network node 2 may be implemented as eNB or eNodeB in LTE, but may also be implemented in the other radio access technologies such BSC in GSM or RNC in UMTS or in WiMax. The network node 2 comprises a controller (CTL), which may be a processor 44 that may be constituted by any suitable Central Processing Unit, CPU, microcontroller, Digital Signal Processor, DSP, etc., capable of executing computer program code. The computer program may be stored in a memory (MEM) 46. The memory 46 can be any combination of a Read And write Memory, RAM, and a Read Only Memory, ROM. The memory 46 may also comprise persistent storage, which, for example, can be any single one or combination of magnetic memory, optical memory, or solid state memory or even remotely mounted memory. The network node 2 further comprises a communication interface (i/f) 42 arranged for wireless communication with other devices or nodes, such as the UEs 4.

When the above-mentioned computer program code is run in the processor 44 of the network node 2, it causes the network node 2 to transmit, via the communication interface 42, at least one threshold parameter set $Th_i$ to the UEs 4, the threshold parameter set $Th_i$ comprising at least a minimum size limit $S_i$ associated with a traffic class i and receive data from the UE 4 in case the amount of data $D_i$ that the UE 4 is ready to transmit exceeds the transmitted minimum size limit $S_i$.

In an exemplary embodiment the network node 2 may, as mentioned above, be configured to transmit threshold parameter sets $Th_i$ comprising also a maximum time limit $T_i$ associated with respective traffic class i and to receive data from the UE 4 in response to that a timer 38 in the UE 4 has reached the transmitted maximum time limit $T_i$.

As also mentioned above the radio network node 2 may in exemplary embodiments be configured to transmit the threshold parameter sets $Th_i$ both as unicast information to dedicated user equipments 4A, 4B or 4C or as broadcast information to all UEs 4.

Turning now to the flow charts in FIGS. 5 and 6 a method performed by the UE 4 according to exemplary embodiments will be described. The method may start in step 500 by establishing a connection with the radio network node 2, when the UE 4 has data that is ready to be transmitted. However the UE 4 may already be connected to the radio network and if so the method starts at step 502. In step 502 the UE 4 is receiving threshold parameter sets $Th_i$ from the radio network node 2. As mentioned above each threshold parameter set $Th_i$ comprising at least a minimum size limit $S_i$ associated with the predefined traffic class i. In step 506 the UE 4 is measuring the amount of data $D_i$ that the UE 4 has ready to transmit. The measured amount of data may be stored in the memory 36 or in any data buffer of the UE 4. In step 508 the UE 4 is comparing the measured amount of data $D_i$ with the minimum size limit $S_i$ for the traffic class i that the UE 4 is ready to transmit. The embodiments depicted in FIGS. 5 and 6 have the above described steps in common.

Figure 5:
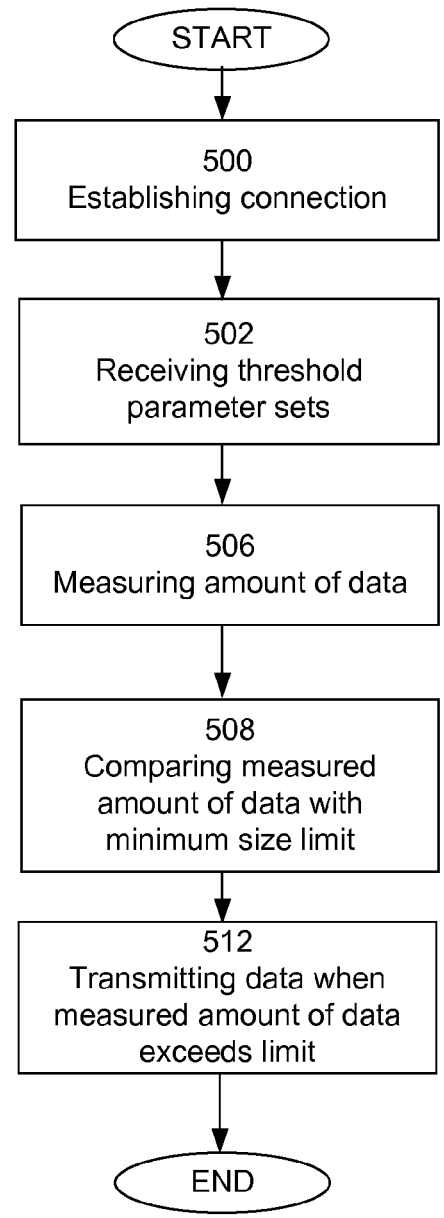
FIG. 5 is a flow chart illustrating a method performed by a user equipment according to an exemplary embodiment of the present disclosure.

If, in the comparing step 508, the measured amount of data $D_i$ exceeds the received minimum size limit $S_i$, in the embodiment of FIG. 5, the method performed by the UE 4 transmits in step 512 in response thereto the data from the UE 4 to the radio network node 2. As mentioned above the measured amount of data $D_i$ may also be an aggregate amount of data $D_i'$. In such a case the UE 4 transmits the aggregate amount of data $D_i'$ in case it exceeds the received minimum size limit $S_i$.

In the embodiment of FIG. 6, the UE 4 that performs the method also comprises the timer 38. Thus, after the comparing step 508, the UE 4 starts, in step 510, the timer 38 in case the measured amount of data $D_i$ is less than the minimum size limit $S_i$. Then in step 516 the UE 4 checks if the timer 38 has lapsed. If the timer 38 has lapsed the method continues to step 512 in which the UE 4 transmits the data from the UE 4 to the radio network node 2, as mentioned above. If the timer 38 has not lapsed the UE 4 continues to check the timer 38 until it lapses, after which the UE 4 commences to step 512.

If however it is determined in step 508 that the measured amount of data $D_i$ exceeds the minimum size limit $S_i$ the UE 4 commences to step 514 and stops the timer 38 if the timer is running and then goes to step 512 as already described above.

It should be noted that step 506, measuring the amount of data that is ready to be transmitted and the comparing step 508 may be performed more or less continuously or with predefined time intervals.

For the method depicted in FIG. 6 it will have the following practical impact on a UE 4 that is ready to transmit data. If the measured amount of data $D_i$ is larger than or equal with the minimum size limit $S_i$, the UE 4 will immediately commence its connection establishment with the network node 2. If the measured amount of data $D_i$ is smaller than the minimum size limit $S_i$ the UE 4 starts the timer 38 which when it expires triggers the connection establishment. If more data arrives during the running of the timer 38 the measured amount of data $D_i$ is recalculated as the total amount of data and if the recalculated data is larger than or equal with the minimum size limit $S_i$ the UE 4 will stop the timer 38 and commence its connection establishment with the network node 2. If the recalculated data is smaller than the minimum size limit $S_i$, no further action is taken since the timer 38 is already running.

Turning now to FIG. 7 a method performed by the network node 2 according to an exemplary embodiment for reducing network load will be described. In step 602 the network node 2 transmits threshold parameter sets $Th_i$ to the UE 4, each threshold parameter set $Th_i$ comprising at least a minimum size limit $S_i$ associated with respective traffic class i. In step 604 the network node 2 receives data from the UE 4 in case the measured amount of data $D_i$ that the UE 4 is ready to transmit exceeds the transmitted minimum size limit $S_i$. In exemplary embodiments transmitting threshold parameter sets may also comprise transmitting a maximum time limit $T_i$ associated with respective traffic class i. As mentioned above the threshold parameter sets $Th_i$ may be transmitted as unicast information to dedicated UEs 4A, 4B or 4C or as broadcast information to all UEs 4.

Thus, different exemplary embodiments have been described in the present disclosure, with which it is possible to reduce the wireless network load system and increase the throughput for traffic classes which are more or less delay tolerant. For MTC devices like e.g. smart power meters and smart household appliances there may be a substantial reduction in network load if the threshold parameter sets are set such that they send their reports, i.e. data that is ready to be transmitted, no more than once an hour or once a day. An advantage for wireless network operators may be the possibility to have specific customized network subscriptions. This may be applicable on smart phones where background applications only are allowed to establish network connections after waiting for some 10ths of a second. This would both improve battery life of the smart phone, since the number of connection establishments would decrease, as well as improve network efficiency, since the total signaling load in the system would decrease).

Although the present disclosure has been described above with reference to specific exemplary embodiments, it is not intended to be limited to the specific form set forth herein. In the pending claims, the term "comprise/comprises" does not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Reference signs in the claims are provided merely as a clarifying example and should not be construed as limiting the scope of the claims in any way.

The invention claimed is:

1. A method performed in a user equipment capable of transmitting data pertaining to at least a first predefined traffic class (i), said method comprising:
   receiving at least a first threshold parameter set ($Th_i$) from a radio network, the first threshold parameter set ($Th_i$) comprising at least a minimum size limit ($S_i$) associated with the first predefined traffic class (i),
   measuring an amount of data ($D_i$) that the user equipment has ready to transmit, said data belonging to different predefined traffic classes and including data pertaining to the first predefined traffic class (i),
   calculating an aggregate amount of measured data ($D_i'$) for the different predefined traffic classes by performing summation of the measured amounts of data pertaining to a subset (J) of the different predefined traffic classes,
   comparing the measured amount of data ($D_i$) with the minimum size limit ($S_i$) associated with the first predefined traffic class (i),
   transmitting said data pertaining to the first predefined traffic class (i) from the user equipment to the radio network where the measured amount of data ($D_i$) exceeds the received minimum size limit ($S_i$), and
   transmitting said aggregate amount of measured data ($D_i'$) from the user equipment to the radio network where the aggregate amount of data ($D_i'$) exceeds the received minimum size limit ($S_i$).

2. The method according to claim 1, wherein the step of receiving the threshold parameter set ($Th_i$) from the radio network further comprises receiving a maximum time limit ($T_i$) associated with the first predefined traffic class (i) and further comprising the steps of
   starting a timer in the user equipment in case the amount of measured data ($D_i$) is less than the received minimum size limit ($S_i$), and
   transmitting said data pertaining to the first predefined traffic class (i) from the user equipment to the radio network in response to that the timer has reached the received maximum time limit ($T_i$).

3. The method according to claim 1, wherein the step of measuring the amount of data ($D_i$) that the user equipment has ready to transmit is performed at a data buffer in a Radio Link Control, RLC, layer.

4. The method according to claim 1, wherein the first threshold parameter set ($Th_i$) is received as unicast information from the radio network.

5. The method according to claim 1, wherein the first threshold parameter set ($Th_i$) is received as broadcast information from the radio network.

6. A user equipment for reducing network load, said user equipment being capable of transmitting data belonging to different predefined traffic classes and including data pertaining to at least a first predefined traffic class (i), said user equipment comprising:
   a communication interface arranged for wireless communication;
   a processor; and
   a memory storing computer program code which, when run in the processor, causes the user equipment to:
      receive, via the communication interface, at least a first threshold parameter set ($Th_i$) from the radio network, the first threshold parameter set ($Th_i$) comprising at least a minimum size limit ($S_i$) associated with the first predefined traffic class (i),
      measure an amount of data ($D_i$) that the user equipment has ready to transmit, said data belonging to different predefined traffic classes and including data pertaining to the first predefined traffic class (i),
      calculate an aggregate amount of measured data ($D_i'$) for the different predefined traffic classes by performing summation of the measured amounts of data pertaining to a subset (J) of the different predefined traffic classes,
      compare the measured amount of data ($D_i$) with the minimum size limit ($S_i$) associated with the first predefined traffic class (i),
      transmit, via the communication interface, said data ($D_i$) pertaining to the first predefined traffic class (i) from the user equipment to the radio network where the measured amount of data ($D_i$) exceeds the received minimum size limit ($S_i$), and
      transmit said aggregate amount of measured data ($D_i'$) from the user equipment to the radio network where the aggregate amount the aggregate amount of data ($D_i'$) exceeds the received minimum size limit (Si).

7. The user equipment according to claim 6, wherein the user equipment further is caused to
   receive, via the communication interface, the first threshold parameter set ($Th_i$) comprising a maximum time limit ($T_i$) associated with the first predefined traffic class (i),
   start a timer in case the amount of measured data ($D_i$) is less than the received minimum size limit ($S_i$), and
   transmit, via the communication interface, said data pertaining to the first predefined traffic class (i) from the user equipment to the radio network in response to that the timer has reached the received maximum time limit ($T_i$).

8. The user equipment according to claim 6, wherein the user equipment further is caused to measure the amount of data ($D_i$) that the user equipment has ready to transmit at a data buffer in a Radio Link Control, RLC, layer.

9. The user equipment according to claim 6, wherein the user equipment further is caused to receive the first threshold parameter set ($Th_i$) as unicast information from the radio network.

10. The user equipment according to claim 6, wherein the user equipment further is caused to receive the threshold parameter set ($Th_i$) as broadcast information from the radio network.

11. The user equipment according to claim 6, wherein the user equipment is a smart phone, mobile phone, cellular phone or a Machine Type Communication, MTC, device, such a power meter or refrigerator.

12. A method performed in a radio network node for reducing network load, said method comprising:
   transmitting at least a first threshold parameter set ($Th_i$) to a user equipment, the first threshold parameter set ($Th_i$) comprising at least a minimum size limit ($S_i$) associated with a first predefined traffic class (i) of a plurality of different predefined traffic classes, and
   receiving data pertaining to the first predefined traffic class from the user equipment where the amount of data ($D_i$) that the user equipment is ready to transmit exceeds the transmitted minimum size limit ($S_i$), and
   receiving, from the user equipment, data for the plurality of predefined traffic classes when an aggregate amount of measured data ($D_i'$) for a subset (J) of the plurality of different predefined traffic classes is summed to exceed the transmitted minimum size limit ($S_i$).

13. The method according to claim 10, wherein the step of transmitting the first threshold parameter set ($Th_i$) to the user equipment further comprises transmitting a maximum time limit ($T_i$) associated with the first predefined traffic class (i) and the step of receiving data from the user equipment is performed in response to that a timer in the user equipment has reached the transmitted maximum time limit ($T_i$).

14. The method according to claim 12, wherein the first threshold parameter set ($Th_i$) is transmitted as unicast information to dedicated user equipments.

15. The method according to claim 12, wherein the first threshold parameter set ($Th_i$) is transmitted as broadcast information to all user equipments.

16. A radio network node for reducing network load, said radio network node comprising:
- a communication interface arranged for wireless communication;
- a processor; and
- a memory storing computer program code which, when run in the processor, causes the radio network node to:
  transmit, via the communication interface, at least a first threshold parameter set ($Th_i$) to a user equipment, the first threshold parameter set ($Th_i$) comprising a minimum size limit ($S_i$) associated with a first predefined traffic class (i) of a plurality of different predefined traffic classes, and
  receive data pertaining to the first predefined traffic class from the user equipment where the amount of data ($D_i$) that the user equipment is ready to transmit exceeds the transmitted minimum size limit ($S_i$), and
  receiving, from the user equipment, data for the plurality of predefined traffic classes when an aggregate amount of measured data ($D_i'$) for a subset (J) the plurality of different predefined traffic classes is summed to exceed the transmitted minimum size limit ($S_i$).

17. The radio network node according to claim 16, wherein the radio network node further is caused to transmit the first threshold parameter set ($Th_i$) comprising a maximum time limit ($T_i$) associated with the first predefined traffic class (i) and to receive data from the user equipment in response to that a timer in the user equipment has reached the transmitted maximum time limit ($T_i$).

18. The radio network node according to claim 16, wherein the radio network node further is caused to transmit the first threshold parameter set ($Th_i$) as unicast information to dedicated user equipments.

19. The radio network node according to claim 16, wherein the radio network node further is caused to transmit the first threshold parameter set ($Th_i$) as broadcast information to user equipments.

\* \* \* \* \*